April 20, 1965 J. B. BROMBAUGH 3,179,855

MOUNTING MEANS FOR A DIODE ASSEMBLY

Filed Aug. 28, 1961 2 Sheets-Sheet 1

INVENTOR.
JOHN B. BROMBAUGH
BY Allen + Allen
ATTORNEYS.

MOUNTING MEANS FOR A DIODE ASSEMBLY

Filed Aug. 28, 1961 2 Sheets-Sheet 2

INVENTOR.
JOHN B. BROMBAUGH,
BY Allen & Allen
ATTORNEYS.

United States Patent Office 3,179,855

Patented Apr. 20, 1965

3,179,855

MOUNTING MEANS FOR A DIODE ASSEMBLY

John B. Brombaugh, Cincinnati, Ohio, assignor to D. H. Baldwin Company, a corporation of Ohio Filed Aug. 28, 1961, Ser. No. 134,201
12 Claims. (Cl. 317—101)

This application has to do with unit assemblies of electrical apparatus such, for example, as may be used in the practice of the invention of the copending applications of Munch, Jr. and Scherer, Serial Nos. 135,101 and 4,444 filed August 28, 1961 and January 25, 1960 respectively and entitled Keying System for Electrical Musical Instrument.

There will be illustrated herein a unit assembly for percussive circuits in an electric organ; and it is a principal object of the invention to provide units which contain requisite electrical elements mounted on a common support and adapted for connection to suitable generators and key switches, and to buses or headers leading eventually to an output system.

It is the object of the invention to provide unit assemblies which are small in size, and adapted for ready repair or replacement.

It is an object of the invention to provide unit assemblies which can be fabricated as such, and which therefore present wiring or connecting operations which are divorcible from the general wiring operations of the instrument, so that these general operations are not delayed or complicated by the addition of the circuit elements in the unit assemblies.

It is an object of the invention to provide unit assemblies for the purpose described such that percussive means may readily be installed in existent organs without interfering with the normal circuits thereof.

It is also an object of the invention to provide a new construction for ganged diodes, which is simple, inexpensive and readily adaptable to the fabrication of unit assemblies.

These and other objects of the invention, which will be set forth hereinafter or will be apparent to one skilled in the art upon reading these specifications are accomplished by that construction and arangement of parts of which an exemplary embodiment will not be described. Reference is made to the accompanying drawings wherein.

Briefly, in the practice of the invention a unit assembly is formed by mounting various electrical elements upon a base of insulating material. The mounting is done by means of the electrical leads with which the circuit elements are normally provided. These leads are generally in the form of wires; and the base panel is provided with holes of a size to accept the wires. Thus relatively small circuit elements may be mounted directly upon an insulative panel without the use of socket members. Moreover, in instances where individual shielding is not required, the electrical circuit elements may be mounted upon the insulative panel in very close proximity to each other.

Electrical interconnections between the several circuit elements and between these elements and external means may be made on the reverse side of the insulative panel. In making these interconnections, the leads from the several circuit elements which have passed through the panel, may be soldered to conductive wires if desired. In many embodiments of the invention, the interconnections may be considerably simplified by providing on the reverse side of the insulative panel printed circuit means as well known in the art. In either event, the soldering of the leads from the several circuit elements either to other wires or to elements of printed circuitry will prevent withdrawal of the leads through the holes in the panel, and result in fixed mounting of the circuit elements on the panel.

The invention also contemplates the provision of special assemblies of circuit elements such as will hereinafter be described in detail. These assemblies or sub-assemblies are also provided with mounting leads, which are not necessarily wires; and the sub-assemblies may be provided with individual shielding elements, also as hereinafter set forth.

Figure 1:
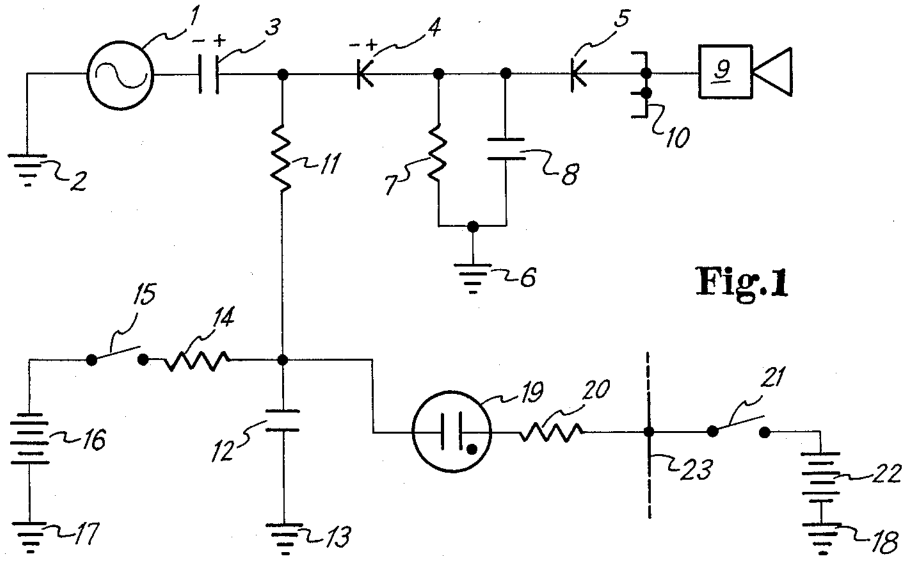
FIGURE 1 is a simplified diagram showing one of the circuits embodied in the unit assembly.

Reference is now made to FIG. 1 for a showing of an exemplary circuit which may be used in connection with the practice of this invention. The circuit illustrated is a single precussive circuit appropriate for connection to a single generator or source of oscillations; and it will be understood that in the unit assemblies of this invention a number of such circuits will be combined. In fact, in the exemplary embodiment hereinafter described, enough circuits of the general type illustrated in FIGURE 1 will be included to take care of a full octave within the range of the electrical musical instrument. However, the exact number of circuits to be combined in a single unit assembly does not constitute a necessary limitation on this invention. The unit assemblies are made in a size and shape convenient for wiring operations, and also convenient for mounting within the organ console, and for replacement and repair.

Additional circuit elements, particularly relatively bulky ones, may be mounted to the reverse side of the panel, as will also later be described and illustrated.

In FIGURE 1, the index numeral 1 indicates a suitable source of electrical oscillations. Various types of sources may be used, and the source itself does not form a part of the unit assembly described herein. The source 1 is a part of a rank of sources of oscillations covering the range of the instrument; and it may be part of a series of octavely related electrical oscillators in which a master oscillator in a high register controls the frequency of oscillators in lower registers. The oscillators may employ thermionic tubes, or may be transistorized; but for purposes of this invention the use of other forms of generators including electro-mechanical means or photo-electrical means is not precluded.

The generator 1 is shown as grounded at 2, or connected to a common return. Coupled to the generator 1 by coupling capacitor 3 is a first unilaterally conductive device 4 which, in the exemplary embodiment, is a solid state diode. The last named device is shown connected for conventional direction of current flow from right to left, although it will be understood by one skilled in the art that it could be connected in the reverse direction if the D.C. potential, to be described hereinafter, is reversed.

In FIGURE 1 a second diode 5 is shown as connected to the first diode 4. Between the junction of the diodes 4 and 5 and the common return or ground 6, there is connected an impedance consisting of a resistor 7 and a capacitor 8 in parallel. The impedance is of such value that it will be low with respect to the reverse impedance of the diode 4 and high with respect to the forward impedance of the diode 5. The purpose of the impedance is to provide a ready path to the common return for any signal from the oscillator 1 which may tend to leak through the first diode 4 when that diode is in the non-conductive state, the impedance, however, not being of sufficient magnitude to interfere seriously with the operation of the circuit when the diodes are in the conductive state.

The diode 5 is shown as connected to an output system 9 which is inclusive of an amplifier and a loud-speaker. The skilled worker in the art will understand that between the diode 5 and the output system there will normally be various tone color systems provided with stop switches. These have not been illustrated, and form no part of the unit assembly hereinafter described. The output system 9 is also a separate entity, not forming a part of the unit assembly. However, there has been illustrated at 10 a bus for the collection of the outputs of other circuits similar to the one illustrated in FIGURE 1. In the particular embodiment, the outputs of the percussive circuits for four adjacent semi-tones are combined at 10. It has been found desirable to combine the outputs of the generators into groups consisting of four adjacent semi-tones, which groups then receive somewhat different filtering treatments as the oscillations pass to the voicing means, as has been illustrated in the copending application referred to above.

A resistor 11 and a capacitor 12 are located in series in a circuit connected at one end to the junction point between the capacitor 3 and diode 4 and at the other end to ground or the common return 13. To the junction point between the resistor 11 and the capacitor 12 there is connected another resistor 14 in series with a switch 15 and a source of negative potential 16, shown in a conventional manner as a battery grounded at 17. It will be understood, however, that the source of potential may be of any suitable nature, as for example, an electronic power supply.

In the operation of the percussive circuit as thus far described, the continuously operating generator 1 applies oscillations to the coupling capacitor 3. During such an excursion of wave form as would tend to make the left-hand terminal of the diode 4 positive, no current will pass to the output system. During the opposite excursion of the wave form, the signal would be confronted with an open circuit with respect to direct current, since the capacitor 3, the switch 15, and the capacitor 12 all act as an open circuit with respect to direct current. Thus, any current, which may tend to flow through the diode 4 from right to left (in charging up the capacitors 3 and 12), would automatically raise the potential of the junction between capacitor 3 and diode 4 to a level sufficient to keep the diode 4 in a non-conducting state. Thus, no signal other than a low level of "leak through" will pass the diode 4. The function of the second diode 5 and the intermediate impedance including resistor 7 and capacitor 8, in handling the leak through problem, has already been described.

The switch 15 is an ordinary make-and-break switch connected to the key of the instrument appropriate to the fundamental frequency of generator 1. Upon closure of the switch 15, the capacitor 12 will be charged to the level of the D.C. source 16 at a rate determined by the value of the resistor 14. The junction point between the capacitor 3 and diode 4 will thus be brought to a D.C. level below that of the right-hand element of the diode 4, rendering it conductive, so that the passage of at least a portion of the positive excursion and all of the negative excursion of the oscillations will be permitted to pass to the output system so long as the switch 15 remains closed. The resistor 14 will control the onset of the tone produced in the output system by the transmitted oscillations. In this way key click is avoided, and the initial cost and maintenance expense of a gradual contact switch is avoided.

When the switch 15 is opened by release of the playing key, the resistor 11 and capacitor 12 cause the junction point between capacitor 3 and diode 4 to become more positive gradually. In this way the resistor 11 and capacitor 12 cause the tone to decay in accordance with an exponential function, producing the effect of percussion when the instrument is played in a staccato fashion.

In most percussive systems for electric organs in simulating the tones of bells, bars, plucked or struck strings, and the like, at least two different and selectable rates of tone decay are desirable. In order to effect a more rapid tone decay than that which would be obtained from the resistor 11 and capacitor 12 alone, another circuit is shown in FIGURE 1 connected between the junction point of resistor 11 and capacitor 12 and ground or the common return at 18. This circuit comprises in series a diode 19, a resistor 20, a stop switch 21, and a source of D.C. potential 22 again shown as a conventional battery, but with the positive pole looking toward the resistor 20. The diode 19 is preferably a gaseous discharge tube of the low-cost neon type. The stop switch 21 can be considered as part of the voicing means of the instrument. It may simply be connected to a stop tab by means of which the operator can select a more rapid or a slower tone decay, or it may be connected for operation by a stop tab or tabs for the selection of particular percussive voices and appropriate rates of tone decay therefor, as will be understood by the worker in the art.

When the switch 21 is open, the elements 19, 20 and 22 have no effect on the other circuit elements above described. If the switch 21 is closed, the capacitor 12, when charged to the level determined by the D.C. voltage source 16, will be provided with parallel discharge paths because the gaseous discharge tube 19 will have had a D.C. voltage placed across it which is approximately the sum of the voltages of the sources 16 and 22. The magnitude of the voltage of the source 22 is preferably of the order of the break-down voltage of the tube 19, so that the junction point between the capacitor 3 and diode 4 can be brought to approximately zero potential by the time the gaseous discharge tube 19 ceases to conduct. Thus, the diodes 4 and 5 reach the non-conductive state more rapidly.

Since the D.C. voltage source 22 and the stop switch 21 will be common to the decay control means of a plurality of circuits such as the one illustrated in FIG. 1, a bus is shown at 23.

In the exemplary embodiment of this invention, a unit assembly will include resistors 7, 11 and 20, capacitors 3, 8 and 12, diodes 4 and 5, bus 10, and some portion of bus 23, together with the gaseous discharge tube 19. The resistor 14 may also be included if desired; but it is usually more convenient to mount it upon the support which carries key switch 15. It will be understood that the elements named as forming part of the unit assembly will be multiplied by the number of individual circuits contained in the unit assembly. In the exemplary embodiment there are 12 such circuits encompassing the semi-tones for a full octave; but the elements for fewer or more of the percussive circuits may be mounted upon a single insulative panel without departing from the spirit of the invention.

A key feature of the unit assembly is the provision of a novel organization of the series diodes 4 and 5. This organization will be appreciated from a consideration of FIGURES 5 to 8 inclusive.

While the diodes themselves may take various forms, they are solid state diodes, preferably of the selenium type, since these may be manufactured or obtained very cheaply and are quite small in size. The construction of an exemplary diode is shown in section in FIGURE 5, where 24 represents a small disc of metal such as iron or steel. One surface of this disc is coated with a thin layer of selenium as at 25. Over this layer there is placed a layer of paper or other insulative substance 26 having a central perforation at 27. A layer of low melting point metal, such as Woods metal, is imposed as at 28 on the paper layer; and a portion of it extends through the perforation 27 so as to make contact with the selenium layer 25.

It will be noted from FIGURE 1 that each percussive circuit includes two diodes 4 and 5 in series in the same orientation with provision for electrical contact to the junction point between the diodes. In producing the diode organization of this invention, use is made of a common contact plate 29 against which a series of the diode elements 5 may be placed. Since in the exemplary organization, four of the percussive circuits of FIGURE 1 will be connected together and to a common voicing means for four adjacent semi-tones, the common connector plate 29 will be long enough to accommodate four of the diodes 5 in spaced relationship, as will be evident from FIGURE 8. In other assemblies, however, fewer or more of the diodes 5 may be assembled against a common connector plate for particular purposes.

It will be evident that the connector plate 29 serves as the bus 10 in FIGURE 1. The connector plate will have means for connection to other circuit elements such as voicing devices (not shown). These means may be a wire or lead soldered to the connector plate; but in the exemplary embodiment the plate is shown as having an integral connector leg 30.

For effecting contact with the opposite side of the diode 5, use is made of a connector member having a head 31 and a leg 32. As will be evident from the exploded view, FIGURE 6, another diode 4 may be placed against the head 31 and a second connector member having a head 33 and a leg 34 will be brought against the opposite surface of the diode 4. These sets of elements will be multiplied by the number of percussive circuits to be connected together, as will be evident from the explanation above.

Figures 6, 7, 8:
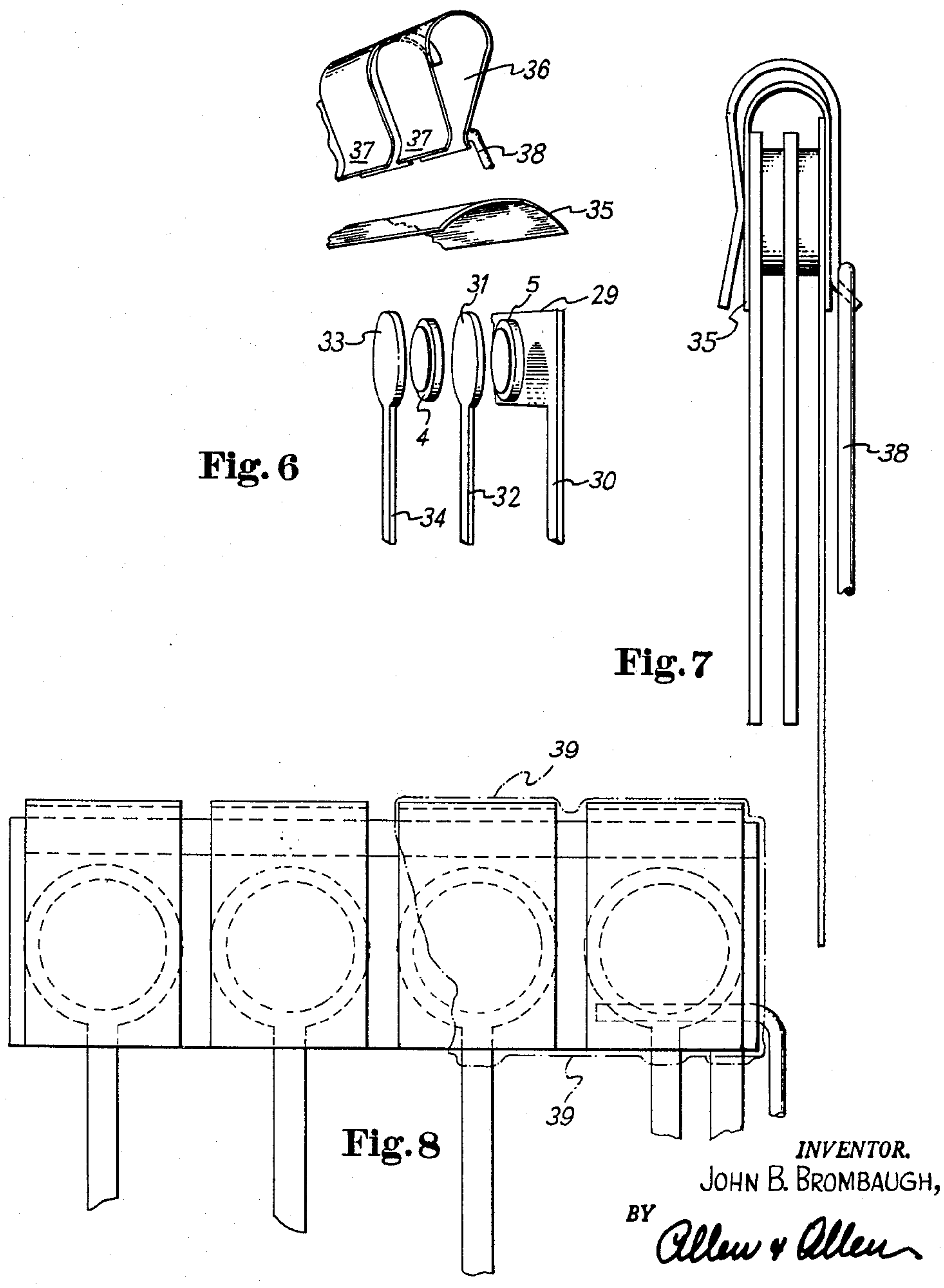
FIGURE 6 is an exploded view of a multiple diode assembly.
FIGURE 7 is an end elevation thereof before coating.
FIGURE 8 is a side elevation of the multiple diode assembly.

When the assembly of connector plate, connector members and diodes has been effected, a thin, flexible piece of insulative material 35, which may be a polyester film or impregnated paper, is placed around three sides of the assembly, as will be best seen in FIGURE 7, and a clamping means is applied to hold the parts together. This clamping means is made of springy metal and preferably has a solid back portion 36 and a series of springing tongues 37, the clamping means being generally U-shaped in cross section. The number of the tongues will be equivalent to the number of individual assemblies of diodes and connecting means, as will be apparent from FIGURE 8.

The clamping means not only holds the parts together and in electrical contact, it acts also as an electrical shielding means to which end it is provided with a ground connection 38. This is preferably a wire soldered to the back portion of the clamping means; and it may, if desired, be made heavy enough to have a function in supporting the diode organization.

Figures 2, 3, 4, 5:
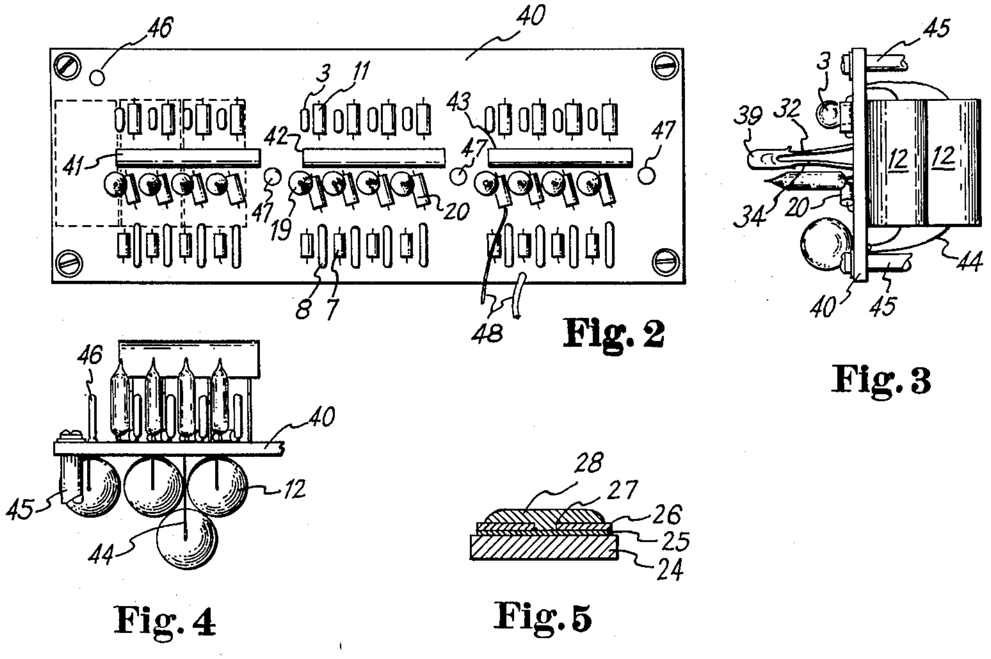
FIGURE 2 is a plan view of the unit assembly.
FIGURE 3 is an end elevation thereof.
FIGURE 4 is a partial side elevation of the unit assembly.
FIGURE 5 is a sectional view across one of the diodes.

When the diode organization is built up as has been described, it is preferred to treat it with a substance of insulative character which will prevent access of moisture and oxygen to the diodes. Wax or other insulative compounds may be used in the molten state, but the best results have been obtained by the use of resinous substances which may be applied as liquids but which will polymerize and harden after application. An epoxy resin will be found to serve very well. The ingredients are mixed so as to provide a liquid into which the top portion of the assembly may be dipped so as to cover all parts of the clamping means, the diodes, and connector plate together with at least the heads 31 and 35 of the connector members. The assembly is then withdrawn and held in the inverted position until polymerization has taken place, heat being used if desired. The preferred epoxy coating is shown in FIGURES 3 and 8 at 39. It not only protects the assembled elements as above indicated, but also helps to maintain them in assembly.

Other diode assemblies may be made in a similar fashion including those in which each circuit contains but a single diode, and those in which each circuit contains more than two diodes.

In FIGURES 2 to 4 inclusive, there is shown an insulative panel 40 made of any suitable substance such as relatively thin resinous laminates. As above indicated, the panel may, if desired, have printed circuitry (not shown) on its under side or on both of its sides. In FIGURE 2 three of the quadruple diode assemblies are indicated at 41, 42 and 43. These are mounted on the insulative panel by passing end portions of the conductor legs 32, 34 and 30 and the conductor 38 through appropriate holes therein, end portions of these leg elements being soldered to conductors or printed circuitry on the opposite side of the panel.

The other elements making up the unit assembly, as hereinabove listed, are mounted as hereinabove described on the insulative panel 40. The coupling capacitors 3, in the form of small disc-shaped elements, may be mounted with resistors 11 located therebetween. The capacitors 12, which are generally relatively bulky, may be mounted underneath the panel by means of their leads 44, the capacitors 12 being cylindrical in shape. However, it does not constitute a departure from the spirit of the invention to broaden the panel 40 somewhat and mount the cylindrical capacitors 12 along that edge which appears at the top of FIGURE 2. When so mounted, the axes of the cylinders will be substantially vertically disposed.

On the opposite side of the subassemblies 41, 42 and 43, a series of gaseous discharge neon tubes 19 and a series of the resistors 20 are shown mounted in alternating relationship. Again, the mounting is done by passing the leads of the circuit elements through holes in the insulative panel and soldering on the reverse side.

The unit assembly is also shown as comprising a series of the disc-shaped capacitors 8 and a series of the resistors 7 in alternating relationship mounted upon the insulating panel. The insulating panels may be mounted in the organ console in any way desired, the mounting forming no limitation on this invention. They may be mounted upon rails provided in the instrument; they may be mounted upon a planar support by means of boxes 45; they may be mounted in clips, or in other ways readily chosen by the skilled worker.

While a particular type of unit assembly has been illustrated and described, it will be understood that the principles of the invention may be applied to the provision of other unit assemblies containing fewer or more circuit elements depending upon the requirements of particular circuitry. The unit assemblies of this invention have been described in connection with the provision of percussive circuits. As set forth in the copending application to which reference has been made, diode circuits may be employed as keying means for oscillations producing ordinary, non-percussive organ tones, having in this connection the advantage of eliminating the necessity for resistive or gradual contact key switches. Certain of the circuits employed in this connection will require no more than one solid state diode each. Assemblies of single solid state diodes may be made in accordance with this invention.

Any suitable means are provided for making the necessary electrical connections to the unit assembly of this invention. For example, in FIGS. 2 and 4 there is shown a post 46 to which a ground connection may be made. Likewise there are other means such as 47 in FIG. 2 to which output connections may be made. Connections to the generators and to the key switches are usually made by flexible leads, two of which are shown at 48 in FIG. 2.

Modifications may be made in the invention without departing from the spirit of it. The invention having been described in certain exemplary embodiments, what is claimed as new and desired to be secured by Letters Patent is:

1. In a solid state diode assembly, the combination of an elongated contact plate having a depending leg, a plurality of solid state diode elements arranged in side by side relationship on said plate, one side of each diode element lying against said plate, contacting means for the opposite side of each diode element, said means comprising a head and a depending contact leg, insulating material covering the opposite side of said contact plate and the noncontacting side of the head of each of said last mentioned contacting means, and a metallic clip of generally U-shaped configuration engaged with opposed portions of said insulating material and serving to hold the named parts in assembly, there being a depending contact leg on said metallic clip.

2. The structure claimed in claim 1 including an insulative board to which said structure is mounted by passing the said legs through holes in said board from one side, there being soldered connections to said legs upon the opposite side of said board.

3. The structure claimed in claim 1 wherein another solid state diode member is positioned on each of the heads of said contact means and in which a second set of contact means each having a head and a depending leg lie in contact with the second mentioned diode elements, the entire assembly being held together by said clip.

4. The structure claimed in claim 3 wherein the clip has a continuous portion lying opposite said contact plate and a plurality of resilient tines connected with said solid portion and making up the remainder of the U-shaped clip.

5. The structure claimed in claim 4 wherein all portions of the structure excepting said contact legs are covered with an insulative material applied thereto in liquid condition.

6. The structure claimed in claim 5 wherein said material is a polymerized and hardened synthetic resin.

7. The structure claimed in claim 6 mounted to an insulative board by passing the contact legs thereof through holes in said board from one side thereof, there being soldered connections to said legs on the opposite side of said board.

8. The structure claimed in claim 7 in which other circuit elements inclusive of capacitors, resistors and gaseous discharge neon tubes are mounted to the same panel by passing leads therefrom through holes in said panel from one side and effecting soldered connections thereto on the opposite side of the panel.

9. The structure claimed in claim 8 wherein the said diode assembly and the said additional circuit elements are interconnected in accordance with the circuit diagram shown in Fig. 1.

10. The structure claimed in claim 9 wherein some at least of the soldered connections are effected to printed circuitry on the side of the board opposite said diode assembly and circuit elements.

11. The structure claimed in claim 10 in which three diode assemblies each having four groups of pairs of diode elements are mounted on said board together with said additional circuit elements making up twelve circuits for twelve adjacent semitones.

12. The structure claimed in claim 11 including a common means for effecting a ground connection mounted on said panel, means for effecting connections to an output system also mounted on said panel, and flexible leads in connection with certain of said circuit elements for connection with sources of electrical oscillations of audio frequency and with key switch means.

References Cited by the Examiner

UNITED STATES PATENTS

| | | | |
|---|---|---|---|
| 1,656,009 | 1/28 | McMullin | 317—101 |
| 1,976,556 | 10/34 | Harty | 317—234 |
| 2,628,270 | 2/53 | Himmel | 317—101 |
| 2,777,192 | 1/57 | Albright et al. | 29—155.5 |

JOHN F. BURNS, *Primary Examiner.*